United States Patent [19]

Coates

[11] 4,373,817

[45] Feb. 15, 1983

[54] COMPUTERIZED MICROMEASURING SYSTEM AND METHOD THEREFOR

[75] Inventor: Vincent J. Coates, Cupertino, Calif.

[73] Assignee: Nanometrics Incorporated, Sunnyvale, Calif.

[21] Appl. No.: 908,260

[22] Filed: May 22, 1978

[51] Int. Cl.³ .......................................... G01B 11/02
[52] U.S. Cl. .................... 356/384; 250/234; 356/387
[58] Field of Search ............ 356/372, 375, 383, 384, 356/387; 250/234, 559, 560, 571

[56] References Cited

U.S. PATENT DOCUMENTS

| | | | |
|---|---|---|---|
| 2,659,823 | 11/1953 | Vossberg | 250/560 |
| 2,931,917 | 4/1960 | Beelitz | 250/560 |
| 3,141,057 | 7/1964 | Acton | 250/560 |
| 3,782,834 | 1/1974 | Fujimori et al. | 250/560 |
| 3,887,281 | 6/1975 | Kurita et al. | 250/571 |
| 3,922,093 | 11/1975 | Dandliker et al. | 250/571 |
| 4,050,821 | 9/1977 | Cuthbert et al. | 356/384 |

Primary Examiner—R. A. Rosenberger
Attorney, Agent, or Firm—Linval B. Castle

[57] ABSTRACT

Very narrow lines, such as integrated circuit conductors, are accurately measured with consistent accuracy using a microscope that projects the image of the narrow object against a slit behind which is a photomultiplier tube. The photomultiplier tube and slit are moved in very small steps under the control of a microcomputer that measures the photomultiplier tube amplitude at each step, eliminates background error due to illumination irregularities, etc., and provides a printout of the line width in micrometers or microinches.

17 Claims, 2 Drawing Figures

COMPUTERIZED MICROMEASURING SYSTEM AND METHOD THEREFOR

BRIEF SUMMARY OF THE INVENTION

This invention relates to the measurement of very narrow widths and particularly to a digital computer operated optical system that precisely measures widths to approximately 1 microinch.

In many areas, such as in the measurement of microcircuits, photomasks, and in-process wafers in the electronic industry, it is important to measure the widths of lines or conductors with very high accuracy and reproducibility. The most practical and economical method of making such measurements is by the use of a projection microscope in which the illuminated object is magnified by the optical system and is projected to produce an image having a width that is perhaps 500 times that of the original object. In prior art systems, these images are then measured by techniques, such as by the use of television cameras or other analog-type devices that are subject to calibration drift, background variations, and difficulty of consistent alignment, thereby requiring constant recalibration.

One prior art system projects the magnified image against a narrow slit that is optically adjusted by the operator to be parallel with the illuminated line to be measured. Located behind the slit is a photomultiplier tube, and both tube and slit are moved across the line image by a manually rotated lead screw connected to a micrometer spindle and barrel for the precise lateral measurement of slit movement. The operator then closely monitors a meter indicating the output of the photomultiplier tube and manually rotates the lead screw so that the slit traverses from one edge of the projected image to the other. The amount of slit travel, measured by the lead screw micrometer between photomultiplier tube output signals representing the leading and lagging edges of the line image, divided by the known magnification of the projection microscope will theoretically yield an accurate measurement of the actual line width.

Unfortunately, the prior art systems described above are limited in performance by the reliance on the operator's judgement, visual acuity and attentiveness. Furthermore, the highly magnified image is not sharply defined and its edges, as determined by the detector output levels, would be interpreted differently by different operators, thereby limiting the reproducibility of measurements. Additional factors that may readily confuse the most experienced operators are wide photomultiplier output variations produced by background variations due to dust settling in the optical system or illumination irregularities.

The present invention overcomes the above-described disadvantages and provides a measuring system that produces consistent and precise measurements irrespective of the various background variations.

Briefly described, the system of the invention includes a microscope that projects the image of the narrow line against a slit behind which is a photomultiplier tube. The photomultiplier tube and slit are mounted to a traveling nut on a threaded lead screw that is rotated by a stepping motor controlled by a microcomputer that also receives the amplitude output signals from the photomultiplier tube. The microcomputer stores the illumination amplitude for each motor step during a reference scan to record, without the object, the amplitude irregularities due to dust in the microscope optics, illumination variations, etc., and then ratios that reference scan with a sample or measuring scan taken with the object in place. With background variations thus eliminated by the ratio operation, the microcomputer readily and accurately detects the line edges and provides a printout of the measured width in either micrometers or microinches.

BRIEF DESCRIPTION OF THE DRAWINGS

In the drawings that illustrate a preferred embodiment of the invention.

DETAILED DESCRIPTION OF THE PREFERRED EMBODIMENT

Figure 1:
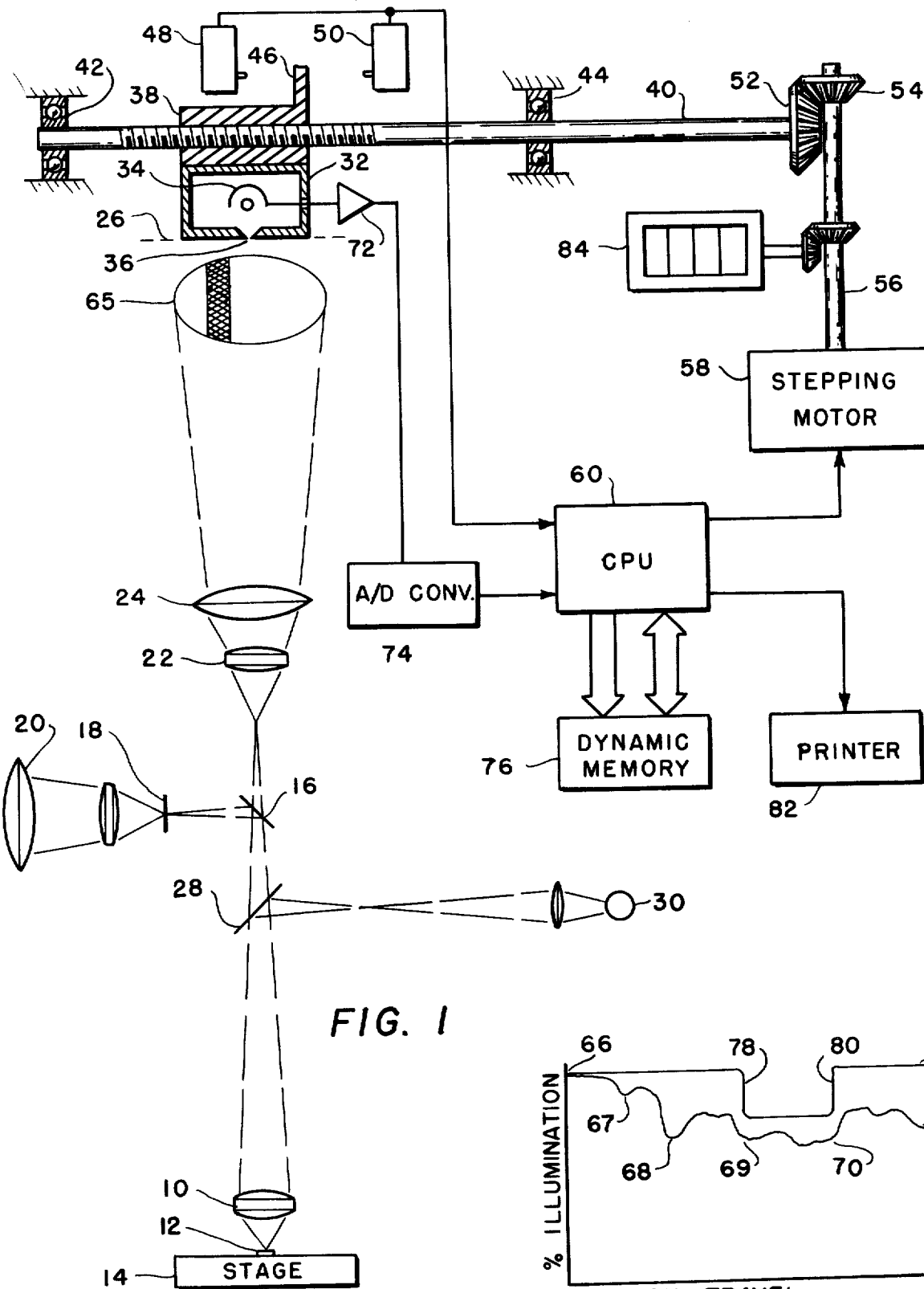
FIG. 1 is a schematic diagram illustrating the computerized micromeasuring system of the invention.

The preferred embodiment of the invention illustrated in the schematic diagram of FIG. 1 includes a compound microscope having an objective lens 10 focused on the surface of an object 12 mounted to a microscope stage 14. The object 12 may be an integrated circuit or a circuit photomask having one or more very narrow lines in its surface to be measured. The image of the object 12 is projected by the objective lens 10 to a beam splitter 16 and through cross-hairs 18 to the operator's eye piece 20. The optical beam also passes through beam splitter 16 to a similar eye piece 22 and focusing lens 24 which focuses the image of object 12 upon a plane 26 that will be subsequently described. The optical beam from the objective lens 10 also passes through a second beam splitter 28 which directs a focused beam of light from a tungsten illumination lamp 30 to the beam splitter 28 and through objective 10 to be focused upon the surface of the object 12 to provide sufficient illumination of the object surface to project its magnified image to the focal plane 26.

The focal plane 26 of the microscope lies on the surface of a housing 32 containing a photomultiplier light detector 34 that is positioned behind a narrow slit 36 in the focal plane. Slit 36 has a width of approximately 0.05 mm and therefore passes a very narrow slice of the magnified image to the photomultiplier cell 34.

The housing 32 containing the photomultiplier cell 34 is mounted to a traveling nut 38 which is moved laterally across the magnified image by a lead screw 40 suitably mounted to a rigid frame member (not shown) by bearings 42 and 44. The traveling nut 38 includes a protrusion 46 positioned between microswitches 48 and 50 to provide a stop mechanism.

One end of the lead screw 40 is provided with a bevel gear 52 which meshes a smaller bevel gear 54 on a shaft 56 that is rotated by a stepping motor 58 under the control of a microcomputer 60. In the preferred embodiment, stepping motor 58 rotates the shaft 56 7.5° per input pulse from computer 60. Gears 52 and 54 provide a 2.5 to 1 reduction to the lead screw 40 which is threaded to the traveling nut 38 by threads having a pitch of 1 mm. Therefore, each rotational step by stepping motor 58 will move traveling nut 38 a distance of 0.00833 mm. If the operator selects microscope lenses that will provide magnification of 500×, then each rotational step from the stepping motor 58 will scan 0.0000166 mm, or 0.0166 micrometers, of the surface of the object 12. It can therefore be seen that by monitoring the output of the photomultiplier cell 34 to detect the edges of lines on the object 12, it is possible to measure lines having a thickness of only a few hundredths of a micrometer.

Unfortunately, line edges of an object, such as the object 12, when magnified 500 times, are not clearly recognizable. Furthermore, the apparently sharp edges of different materials in the object, such as the edge of a photomask line, or deposited polysilicon, have different appearing edges when magnified. In addition, microscopic dust particles and variations in the illumination of the object 12 will, when magnified, cause irregularities that will produce a very erratic output of the photomultiplier tube 34 as the slit 36 is scanned across the magnified image.

Figure 2:
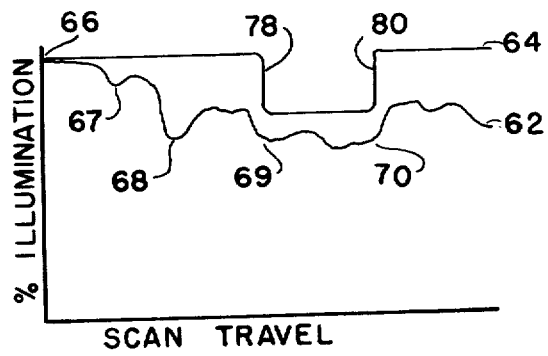
FIG. 2 is a graph representing a photomultiplier tube output during one scan.

FIG. 2 illustrates a curve of a typical photomultiplier output curve 62 taken during one sample scan across a magnified image and compared with an ideal scan illustrated by the accompanying curve 64. At the optical center 66, slit 36 may be positioned off the edge of the object 12 as shown in the typical image pattern 65 in FIG. 1. As the scan proceeds, microscopic dust particles in the microscope optics may produce dips 67 and 68 while variations in the illumination intensity will cause other irregularities in the curve 62. As the slit passes over the leading edge of the line to be measured, a dip 69 will appear in the curve and at the trailing edge an increased output 70 will be noted. It will be appreciated that the leading and lagging edge outputs 69 and 70 are extremely difficult to recognize and manual measurements made merely by observing the output curve of the photomultiplier tube as the slit 36 is scanned across the image will be extremely difficult to make with reasonable accuracy and reproducibility even by the most experienced operator.

The computer in the system clarifies the output signal so that it appears as the ideal curve 64 of FIG. 2 by storing the scan irregularities during a reference scan, without the object 12, and then by correcting for these irregularities in a subsequent sample scan with the object in place.

The photomultiplier tube 34 is connected to an amplifier 72 which linearly provides an output of between 0 and 10 volts D.C. in accordance with the output of the cell 34. The output of amplifier 72 is applied to an analog-to-digital converter 74, the output of which is coupled to an input port of the microcomputer 60. Also connected to an input port of the microcomputer are the output signals from microswitches 48 and 50 which, when activated by the stop mechanism 46 on the traveling nut 38, signal the computer 60 to stop further movement of stepping motor 58.

The microcomputer 60 may be any commercially available microcomputer that can operate in conjunction with a suitable dynamic recovery 76. In the preferred embodiment, memory 76 is a random access memory having the capacity of at least 4K bytes of storage. The memory 76 is arranged to store 1,000 channels, of 16 bits per channel, of photomultiplier tube output for a reference scan without an object 12 in place, and a similar 1,000 channels of photomultiplier tube output for a sample scan with the object 12 in position. Upon completion of the scans, the microcomputer 60 ratios the sample scan and the reference scan and obtains an output similar to the ideal curve 64 of FIG. 2. Since the microcomputer 60 is referencing the stored photomultiplier output against each position of the stepping motor 58, it can readily compute the leading and lagging edges 78 and 80 of the measured line and convert the measurement into the dimensions on the surface of the object 12. The dimensions are then printed by the printer 82 coupled to an output port of the microcomputer 60.

OPERATION

Prior to measuring the width of a line on an object, the operator first makes a reference scan by instructing the microcomputer 60 to operate the stepping motor 58 so that the mechanical stop 46 on the traveling nut 38 actuates one or the other microswitch 48 or 50. The reference scan is then initiated and the microcomputer 60 stores the digitized output signals of the photomultiplier tube 34 for each step of the stepping motor 58. If desired, the operator may observe the rotation of shaft 56 and hence the movement of the slit 36 through counter 84 which is coupled to the shaft 56 by suitable level gears.

Upon completion of the reference scan, the optical center of the scan, i.e., the vertical cross-hair position, is located and the computer registers its location. An object with a light-to-dark edge is precisely located at the vertical cross-hair by the operator. The computer then drives the traveling nut 38 from its stop position at microswitch 50 to the point where the detector 34 senses the change in intensity similar to the change due to the edge 78 in the curve 64 of FIG. 2. The computer 60 counts the stepping motor pulses between the microswitch 50 and the detected edge and stores the landscrew position in memory as the location of the exact center of the optical system. In all future scans, the computer starts the scan from this precise point to make the desired measurements.

Upon completion of an edge alignment scan, the object 12 is placed on the stage 14 and, by observing the object 12 through the eye piece 20 and cross-hairs 18, the operator adjusts the stage 14 so that the desired line to be measured is within the field of view parallel with the vertical cross-hair in the eye piece, and is in the direction of scan of the slit 36 which, in the preferred embodiment, is to the right of the vertical cross-hair. Microcomputer 60 is then directed to start the sample scan and, as the scan progresses, the photomultiplier tube 34 output is digitized and stored in the memory in a location reserved for each particular step of the stepping motor 58. Upon completion of the sample scan, the microcomputer 60 ratios both channels for each stepping motor location, compares the positions of the leading and lagging edge of the measured line, counts the stepping motor pulses between leading and lagging edges, and prints out the precise line width on the printer 82. The computer 60 thus determines the edges of the line in a manner based upon accepted mathematical principles and is programmed to eliminate false readings from background variations, such as caused by microscopic dust on the eye piece or in the optical system, imperfect light source illumination, etc. Since background intensities are being charted at each of 1,000 steps across the reference scan, the computer can readily ratio each of the steps with corresponding steps during subsequent sample scans to provide a precise reproducible measurement of extremely narrow lines with drift in its calibration.

Having thus described my invention, what is claimed is:

1. A system for the measurement of very narrow lines on an object, said system including: microscope means including object illumination means for projecting a magnified image of said object to a focal plane; a photodetector; a housing enclosing said photodetector, said housing having a narrow slit positioned on said focal plane and adjacent said photodetector for transmitting a thin section of said image to said photodetector; a rotatable lead screw on an axis parallel with said focal plane and perpendicular to the slit in said housing; and a traveling nut threaded on said lead screw, said housing being connected to said nut whereby rotation of said lead screw scans said slit across said projected image; the improvement comprising:

a stepping motor coupled to said lead screw, said motor providing a predetermined degree of rotation to said lead screw for each input energizing pulse;

a microcomputer coupled to said photodetector for receiving signals indicative of the amount of radiation sensed by said photodetector, said microcomputer including means for providing energizing pulses to said stepping motor;

a dynamic memory associated with said microcomputer, said memory having means for storing first and second binary coded signals for each position of said stepping motor, said first binary signal representing the photodetector radiation sensed during a reference scan, said second binary signal representing the photodetector radiation sensed during a sample scan; and ratio means in said microcomputer for dividing said second stored binary signal by said first stored binary signal to obtain a scan ratio at each of said stepping motor positions.

2. The system claimed in claim 1 further including output means coupled to said microcomputer for indicating the width of a line measured by a scan of said photodetector.

3. The system claimed in claim 2 whereby said output means is a printer.

4. The system claimed in claim 3 wherein said photodetector is a photomultiplier tube.

5. The system claimed in claim 4 further including a linear amplifier coupled to said photomultiplier tube for amplifying the signal from said multiplier tube to said microcomputer.

6. The system claimed in claim 5 further including an analog-to-digital converter coupled to the output of said amplifier for digitizing the amplified signal therefrom.

7. The system claimed in claim 6 further including stop means cooperating with said traveling nut for signaling the scanning limits to said microcomputer.

8. In a system for measuring the width of a very narrow line by projecting a magnified image of said line against a photodetector positioned behind a narrow slit in the focal plane, said slit being scanned across said image by a rotatable lead screw, a method of accurately detecting the leading and lagging edge of said scanned line without image background variations, said method comprising the steps of:

rotating the rotatable lead screw in discrete steps of predetermined known increments of rotation to scan an area of the image unoccupied by the narrow line to be measured;

registering the output signals of said photodetector at each of said steps to obtain a reference scan signal pattern, the variations in said reference scan signal pattern representing background variations in said system;

adjusting said narrow line into a position in the magnified image and parallel with said narrow slit;

rotating said rotatable lead screw in discrete steps to scan the area in said image occupied by said narrow line;

registering the output signal of said photodetector for each of said steps to obtain a measuring scan signal pattern, the variations in said sample scan signal pattern representing background variations and photodetector variations indicating the leading and lagging edges of said narrow line;

dividing said sample scan signal pattern by said reference scan signal pattern at each of said discrete steps to obtain signal variations indicative of said leading and lagging edges of said narrow line; and counting the number of said discrete steps of said stepping motor between said signal variations indicative of said leading and lagging edges to obtain the width of said narrow line in said projected image.

9. The method claimed in claim 8 further including the step of registering the position of the optical center of a scan prior to the step of adjusting said narrow line into position.

10. The method claimed in claim 9 wherein the image projecting system includes visual monitoring means having a vertical cross-hair positioned in the optical center and optically parallel with said narrow slit and wherein said optical center registering step includes the steps of:

positioning an object having a light-to-dark edge with said edge on the vertical cross-hair;

rotating said rotatable lead screw in discrete steps from a predetermined index location to a point where said photodetector produces an output variation indicating said edge; and registering the position of said lead screw, said position indicating the optical center of a scan and providing a beginning point for subsequent scans.

11. The method claimed in claim 10 further including the step of dividing said width of narrow line in said projected image by the magnification of the image projection system to obtain the width of the narrow line.

12. The method claimed in claim 11 wherein said image projection system is a compound microscope.

13. The method claimed in claim 12 wherein said lead screw is rotated in discrete steps by a stepping motor.

14. The method claimed in claim 13 wherein the signals indicative of the output of said photodetector are stored in binary form in a random access memory associated with a microcomputer.

15. The method claimed in claim 14 wherein said microcomputer generates pulses that control the operation of said stepping motor.

16. The method claimed in claim 15 wherein said microcomputer divides said sample scan signal pattern by said reference scan signal pattern and produces an output signal indicative of the width of said narrow line.

17. The method claimed in claim 16 wherein said computer output signals drive a printer.

* * * * *